Dec. 13, 1932.  W. G. BENNINGHOFF  1,890,452
BORING BAR FOR USE UPON PIPE COUPLING BLANKS OR THE LIKE
Filed Nov. 8, 1930   3 Sheets-Sheet 1
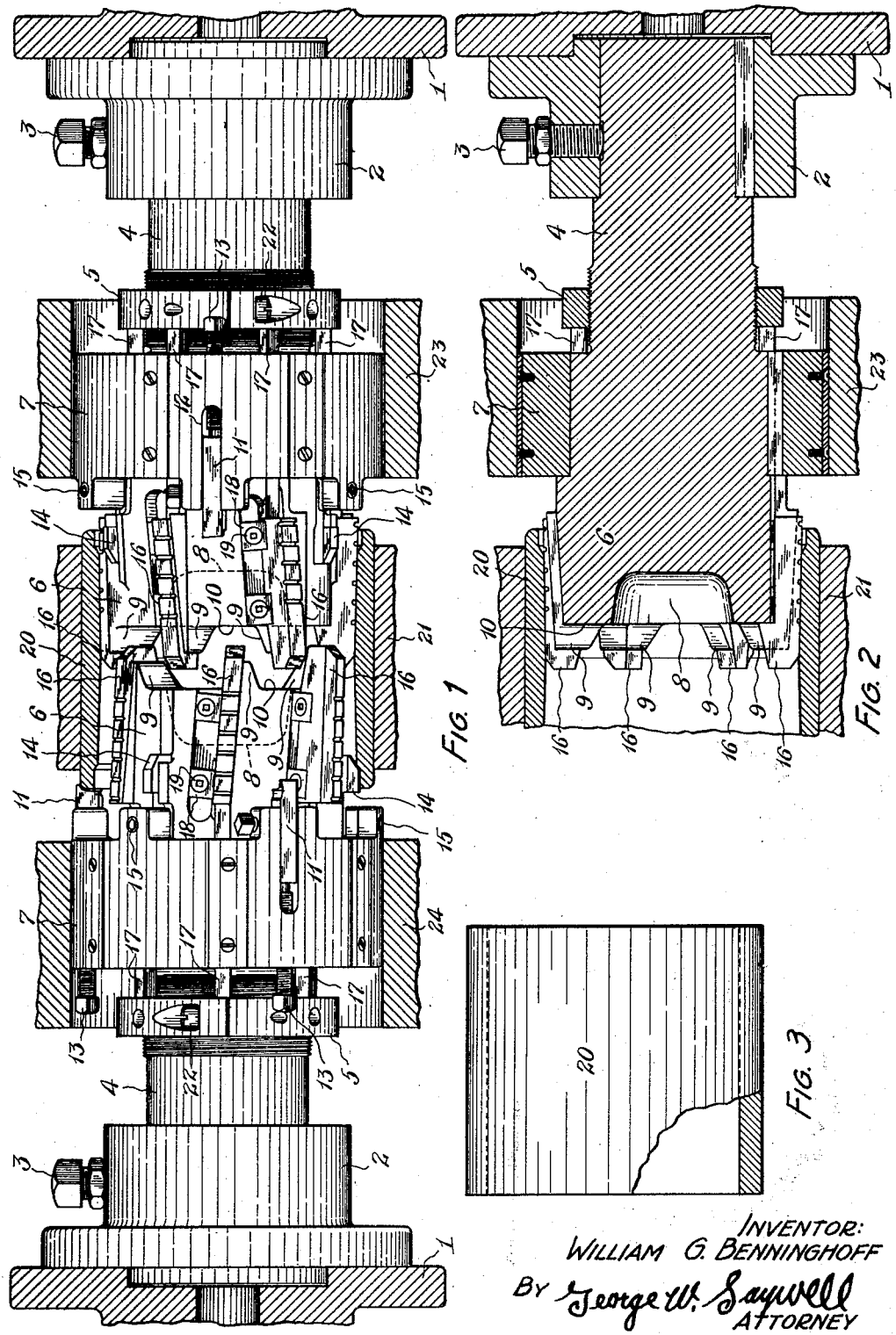
INVENTOR:
WILLIAM G. BENNINGHOFF
By George W. Saywell
ATTORNEY Dec. 13, 1932.  W. G. BENNINGHOFF  1,890,452
BORING BAR FOR USE UPON PIPE COUPLING BLANKS OR THE LIKE
Filed Nov. 8, 1930  3 Sheets-Sheet 2

INVENTOR:
WILLIAM G. BENNINGHOFF
By George W. Saywell
ATTORNEY

Dec. 13, 1932.    W. G. BENNINGHOFF    1,890,452
BORING BAR FOR USE UPON PIPE COUPLING BLANKS OR THE LIKE
Filed Nov. 8, 1930    3 Sheets-Sheet 3

INVENTOR:
WILLIAM G. BENNINGHOFF
By George W. Saywell
ATTORNEY

Patented Dec. 13, 1932

1,890,452

UNITED STATES PATENT OFFICE

WILLIAM G. BENNINGHOFF, OF CLEVELAND HEIGHTS, OHIO

BORING BAR FOR USE UPON PIPE COUPLING BLANKS OR THE LIKE

Application filed November 8, 1930. Serial No. 494,359.

The invention particularly relates to a boring bar adapted for use in opposed axially-aligned right-hand and left-hand pairs in which are mounted opposed cutting tools. The invention is designed particularly for working upon the interior and ends of tubular blanks, such as those intended for pipe couplings and the like. The working ends of the tools extend forwardly of the heads of the respective bars and overlap the ends of the respectively opposed tools, in order to complete the operation upon the blank which is being finished, without creating or leaving any bur or other untreated or blemished section in the completed blank. Some of the improved details of the new boring bar consist in special supports for the extending cutting ends of the tools; means for making room for the metal removed by the cutters, even though the tools are used in opposed pairs in a tubular blank and their cutting ends overlap; and special means for adjusting the cutting tools and permitting convenient replacement thereof. Other improvements will hereinafter appear and be fully described upon reference to the accompanying drawings.

The annexed drawings and the following description set forth in detail certain means exemplifying my invention, such disclosed means constituting, however, only one of the various forms in which the principle of the invention may be embodied.

In said annexed drawings:

Figure 1 is an elevation of an assembly of an opposed axially-aligned pair of the improved boring bars, equipped with tools, fragmentary portions of the respective main supporting structures being shown, partially in section, and the blank, upon which the boring bars are working, being shown in vertical longitudinal section, the particular blank shown for the purpose of illustration being a pipe coupling blank;

Figure 2 is a longitudinal section of the right-hand boring bar shown in Figure 1, the section being taken in the planes indicated by the line 2—2, Figure 8;

Figure 3 is an elevation, partially broken away and partially in section, of the pipe coupling blank, which is shown as an illustration of the form of blanks upon which the improved bar is adapted to operate;

Figure 4:
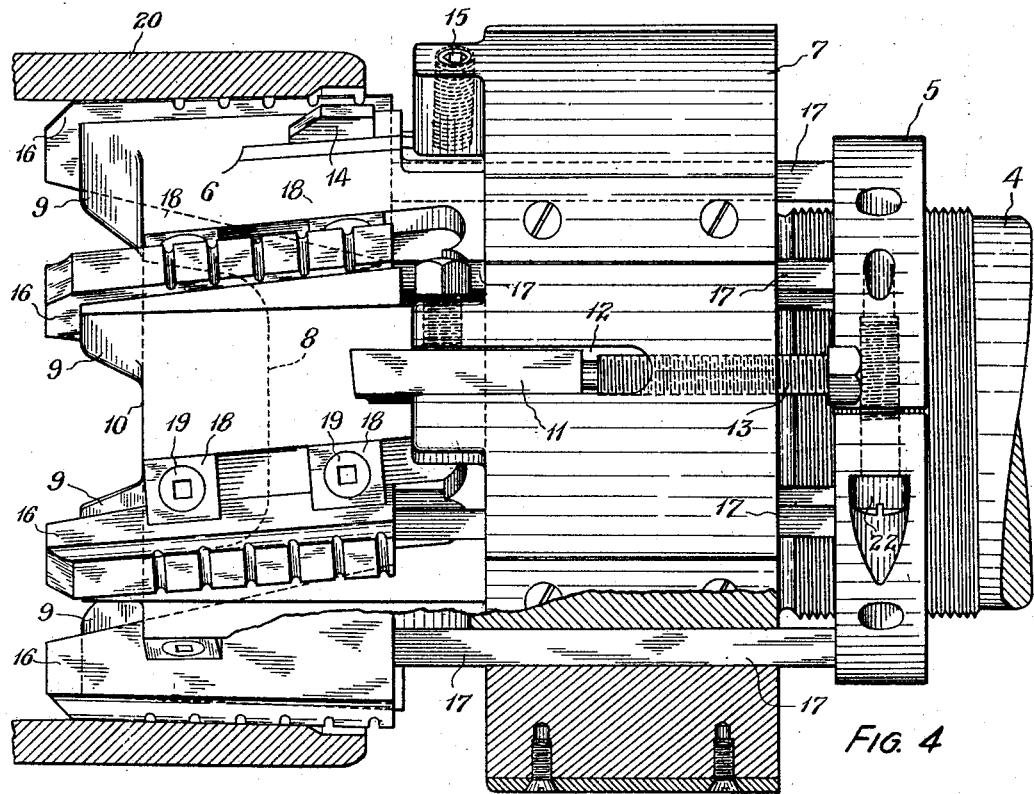
Figure 4 is an enlarged side elevation, partially in section and partially broken away, of the right-hand boring bar shown in Figure 1.
Figure 5:
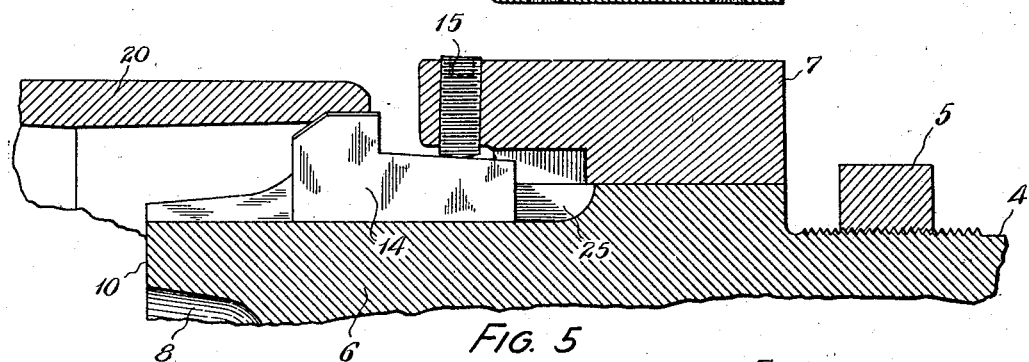
Figure 5 is a fragmentary longitudinal section of a boring bar, showing particularly the relative position therein of a certain recessing tool, and the manner of mounting and adjusting the same.

Referring to the annexed drawings, in which the same respective elements are indicated by the same numbers in the several views, I show the shank 4 of a boring bar adapted to be positioned and secured by a set screw 3 in an adaptor 2 mounted in a supporting structure 1. A portion of the shank 4 is peripherally threaded for engagement with an adjusting ring 5 and to a body portion 6 of the bar, adjacent the shank 4, is secured, by any suitable means, such as a key, a pilot ring 7. The opposite end of the body 6 is formed with a central recess 8 opening from the face 10 of the body, and extended from this face 10 is an annular series of spaced seats or lugs 9 which form supports for the cutting ends of boring tools, as will be hereinafter fully described.

The boring bar body and pilot and adjusting rings, above-described, form mountings for various cutting tools which are positioned and adjusted in the manner hereinafter fully described, it being understood that there are opposed right-hand and left-hand boring bars and that the blank 20 is mounted adjacent to and surrounding the opposed inner faces 10 of the two bars and operated upon simultaneously at its two ends and interiorly by tools which are mounted in the opposed bars. In the form of device illustrated in the accompanying drawings, I show tools for effecting three operations: (1) facing and chamfering; (2) recessing; and (3) boring. These tools are all worked at the same time so that the facing and chamfering, recessing, and boring operations are simultaneously effected.

Figure 6:
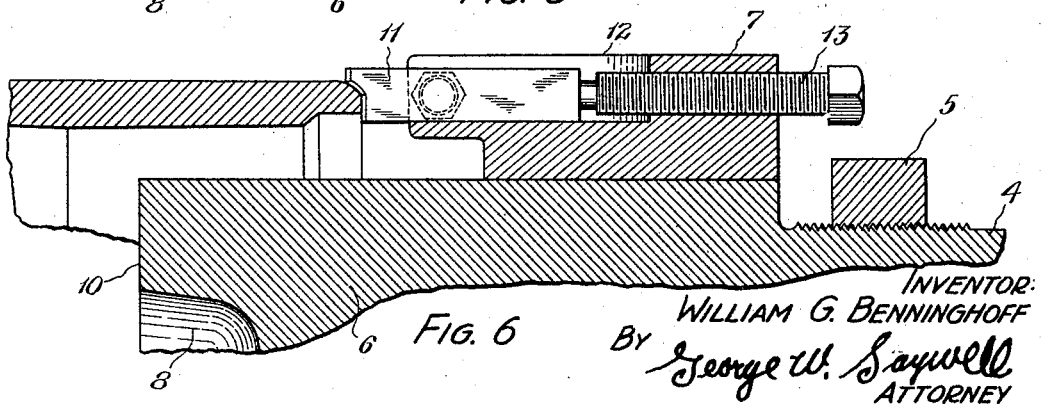
Figure 6 is a fragmentary longitudinal section of a boring bar, showing particularly the position therein of a certain facing and chamfering tool and the manner of mounting and adjusting the same.
Figure 8:
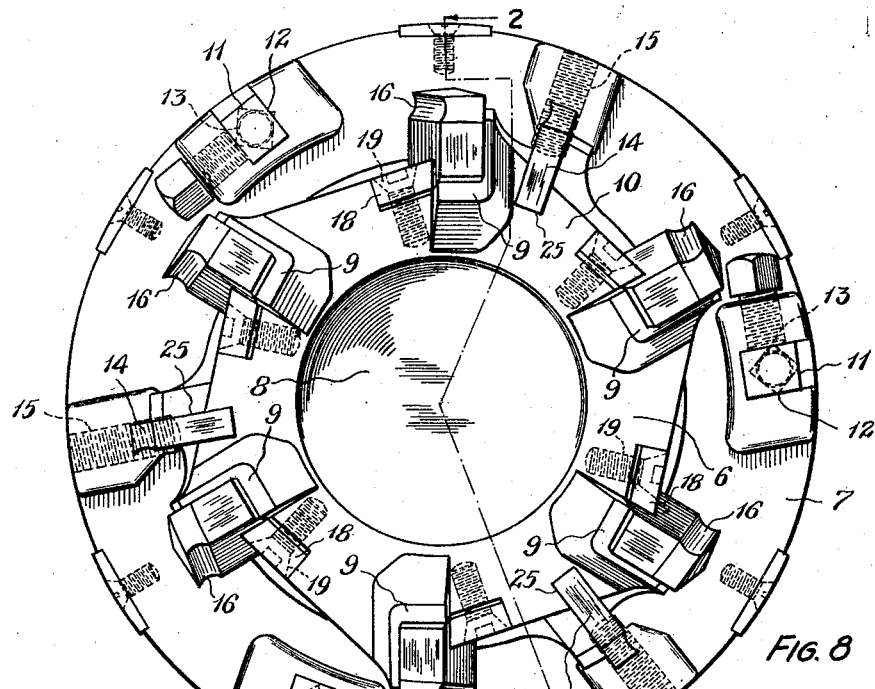
Figure 8 is an end elevation of one boring bar.

The pilot ring 7 is formed with recesses 12 adapted to accommodate, and permit the longitudinal adjustment of, facing and chamfering tools 11. These tools 11 are three in number, in the embodiment of the invention illustrated, but any suitable number may be used. These tools 11 cut the blanks to length, and round off and face the blank ends. The tools 11 are adjusted by screws 13, Figure 6, and held by set screws. Recesses 25 are formed in the peripheral area of the body 6 and are adapted to accommodate recessing tools 14, three in number, in the embodiment illustrated, but any suitable number may be used. These tools 14 are manually adjustable and held in the body 6 in adjusted position by set screws 15 mounted in the pilot ring 7. Intersecting the face 10 of the body member 6 are grooves adapted to accommodate boring blades 16, six in number, in the embodiment illustrated, but any suitable number may be used. The boring blades 16 are held to adjusted position by thrust bars 17, which pass through and are seated in grooves formed in a part of the body 6 and contact at one end with the rear faces of the boring blades 16 and at the other end with the adjusting ring 5. This latter ring 5 is of split formation and is locked in adjusted position upon the threaded portion of the shank 4 by means of a screw 22. The boring blades 16 are frictionally held in their grooves against radial displacement by pairs of clamps 18 held in place by screws 19, as clearly shown in Figures 4 and 8.

Figure 7:
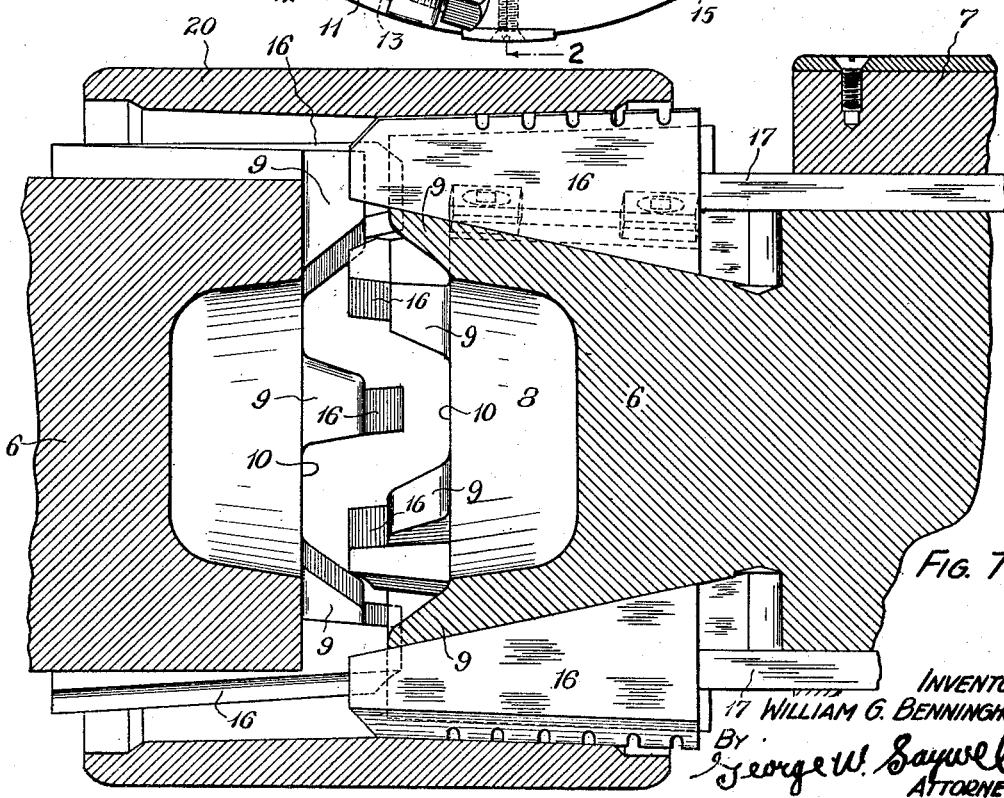
Figure 7 is a fragmentary axial section through the axially-aligned boring bars, showing the position therein of certain boring tools and the manner of mounting and adjusting the same, this view showing one complete bar and suggesting the opposed boring tool end of the other bar.

The invention is designed to be operated either through the rotating of the boring bars, or the rotating of the coupling blank 20, and in the illustrated form of the invention it is assumed that it is the coupling blank 20 that is rotated. The relation of the forward faces of two opposed boring bars working upon the same blank 20, is shown in Figure 7, and it will be noted that the cutting edges of the opposed boring tools 16 overlap. The invention is designed so that the forward edge of a boring blade shall come at least to the center of the coupling 20 and, in fact, the opposed boring blades actually overlap so as to effect their boring operation without leaving any fins or other disadvantageous or incomplete effects in the coupling. Figure 3 shows one of the coupling blanks and Figure 7 shows the coupling when the boring bar operations are completed, the completed coupling of Figure 7 requiring, of course, a further threading operation, before it is ready for use; the apparatus for effecting this threading operation, being however, not a part of this invention.

The construction described, and shown in the acompanying drawings, provides, in addition to the operation of the respective cutting tools and their required adjustment, for supporting the extended cutting ends of the boring blades 16 and for making room for metal removed centrally of the opposed faces 10 of the two boring bars. The supports for the cutting edges of the boring blades 16 are furnished by the seats or lugs 9 which are arranged forwardly of the bar faces 10 and in spaced relation in an annular ring and provide a backing for the sides of the blades 16 opposite the cutting faces as well as for the bottom of the blades. The space for the metal removed is provided by the recesses 8 which are formed in the center of the bodies 6 adjacent the faces 10. I direct particular attention to the interspacing and staggered arrangement of the various tools 16 and the seats 9, clearly shown in the end elevation of Figure 8.

A fragmentary portion 21 of a supporting structure for the coupling blank 20, as also, fragmentary portions 23 and 24 of supporting structures for the pair of pilot rings 7, are shown in Figure 1. It is assumed that desired and suitable oil passages and grooves are provided in the boring bars, whose construction and functions are well-known to those skilled in the art and hence need not be shown or described.

What I claim is:

1. A boring bar comprising, a body member, an adjusting ring having threaded engagement with said body member, the latter being formed with grooves adapted to accommodate cutting tools, adjusting bars extended through the body member and at one end abutting said adjusting ring and at the other end adapted to extend into said grooves, said body member being also formed with surface recesses adapted to accommodate other cutting tools, and means positioned in transverse alignment with said surface recesses for securing tools in said recesses.

2. A boring bar comprising, a body member, an adjusting ring movably longitudinally of and upon the body member, a pilot ring secured upon the body member, said pilot ring being formed with recesses therethrough adapted to accommodate cutting tools, adjusting screws in said pilot ring extended into said recesses, means for holding said cutting tools, said body member being formed with grooves adapted to accommodate other cutting tools, adjusting bars extended through the body member and at one end abutting said adjusting ring and at the other end adapted to extend into said grooves, and tool-holding means for said last mentioned cutting tools mounted in the body member adjacent said grooves.

3. A boring bar comprising, a body member having a shank portion, an adjusting ring having threaded engagement with said shank portion, a pilot ring secured upon the body member, said pilot ring being formed with recesses adapted to accommodate cutting tools, adjusting screws in said pilot ring extended into said recesses, said body member being formed with grooves adapted to accommodate a second set of cutting tools, adjusting bars extended through the body member and at one end abutting said adjusting ring and at the other end adapted to extend into said grooves, said body member being also formed with surface recesses adapted to accommodate other cutting tools, and means on said pilot ring adapted to secure said last-mentioned tools in said surface recesses.

4. A boring bar comprising a body member having an end face provided with a recess forming a storage chamber, means at the exterior longitudinal surface of said body member adapted to hold boring tools so as to extend outwardly from said surface in annularly spaced relation with respect to each other and so as to extend forwardly with respect to said face, and annularly spaced means extending forwardly from said face in alignment with the first-mentioned means and adapted to provide radial and lateral support for the forwardly extending ends of the tools, the second-mentioned means being formed so that the tools supported thereby may overlap, and be spaced from, similar tools mounted on a similar boring bar when the two boring bars are fed toward each other whereby the material removed by the overlapping tools may pass into said recess.

5. A boring bar comprising a body member having an end face provided with a central recess forming a storage chamber and having longitudinal grooves in its exterior longitudinal surface, said grooves extending to said face and being adapted to accommodate boring tools in forwardly extended relation with respect to said face, means for securing the boring tools in said grooves, and spaced lugs extending forwardly from said face and having grooves in alignment with first-mentioned grooves for supporting radially and laterally the forwardly extended ends of the tools, said lugs being spaced apart and formed so that, when two similar boring bars are fed toward each other, the tools mounted thereon may overlap in spaced relation whereby the material removed by the overlapping tools may pass into said central recess.

Signed by me this 7th day of November, 1930.

WILLIAM G. BENNINGHOFF.